United States Patent [19]

Lundy

[11] Patent Number: 5,193,453
[45] Date of Patent: Mar. 16, 1993

[54] RAILROAD CAR TRASH COMPACTOR

[76] Inventor: Paul A. Lundy, 4316 Phoenix, Ames, Iowa 50010

[21] Appl. No.: 804,800

[22] Filed: Dec. 9, 1991

[51] Int. Cl.$^5$ .............................................. B30B 15/00
[52] U.S. Cl. .................................... 100/100; 100/102; 100/245; 100/278; 105/238.1; 414/514
[58] Field of Search ...................... 100/65, 68, 73, 100, 100/102, 112, 226, 240, 245, 278, 280; 414/509, 510, 511, 513, 514, 521, 525.1; 105/238.1, 355; 134/166 R, 167 R, 168 R, 169 R; 4/323

[56] References Cited

U.S. PATENT DOCUMENTS

| | | | |
|---|---|---|---|
| 2,696,925 | 12/1954 | Le Laurin | 414/514 |
| 3,021,968 | 2/1962 | Myers | 414/513 |
| 3,442,404 | 5/1969 | Pioch | 100/229 A |
| 3,901,394 | 8/1975 | Bowles | 414/513 |
| 4,004,703 | 1/1977 | Johnson, Jr. | 100/278 |
| 4,015,727 | 4/1977 | Rezak | 414/521 |
| 4,199,297 | 4/1980 | Abolins | 100/278 |
| 4,249,852 | 2/1981 | Alstad | 414/514 |
| 4,359,307 | 11/1982 | Johnson, Jr. | 100/278 |
| 4,951,479 | 8/1990 | Araquistain | 105/355 |
| 5,013,530 | 5/1991 | McGregor | 134/166 R |

FOREIGN PATENT DOCUMENTS

| | | | |
|---|---|---|---|
| 201145 | 1/1966 | Sweden | 134/168 R |
| 1584071 | 2/1981 | United Kingdom | 414/521 |

Primary Examiner—Philip R. Coe
Assistant Examiner—Randall Edward Chin
Attorney, Agent, or Firm—Zarley, McKee, Thomte, Voorhees & Sease

[57] ABSTRACT

A railroad car trash compactor includes an elongated box defining an elongated trash compartment therein. A compactor blade is movably mounted within the box and is movable from a fill position adjacent the forward end of the box to a discharge position adjacent the rear end of the box. Discharge doors are openable at the rear end of the box to permit the expelling of trash from the box by means of the trash compactor. Steam jets are provided within the compartment for cleaning the compartment.

7 Claims, 4 Drawing Sheets

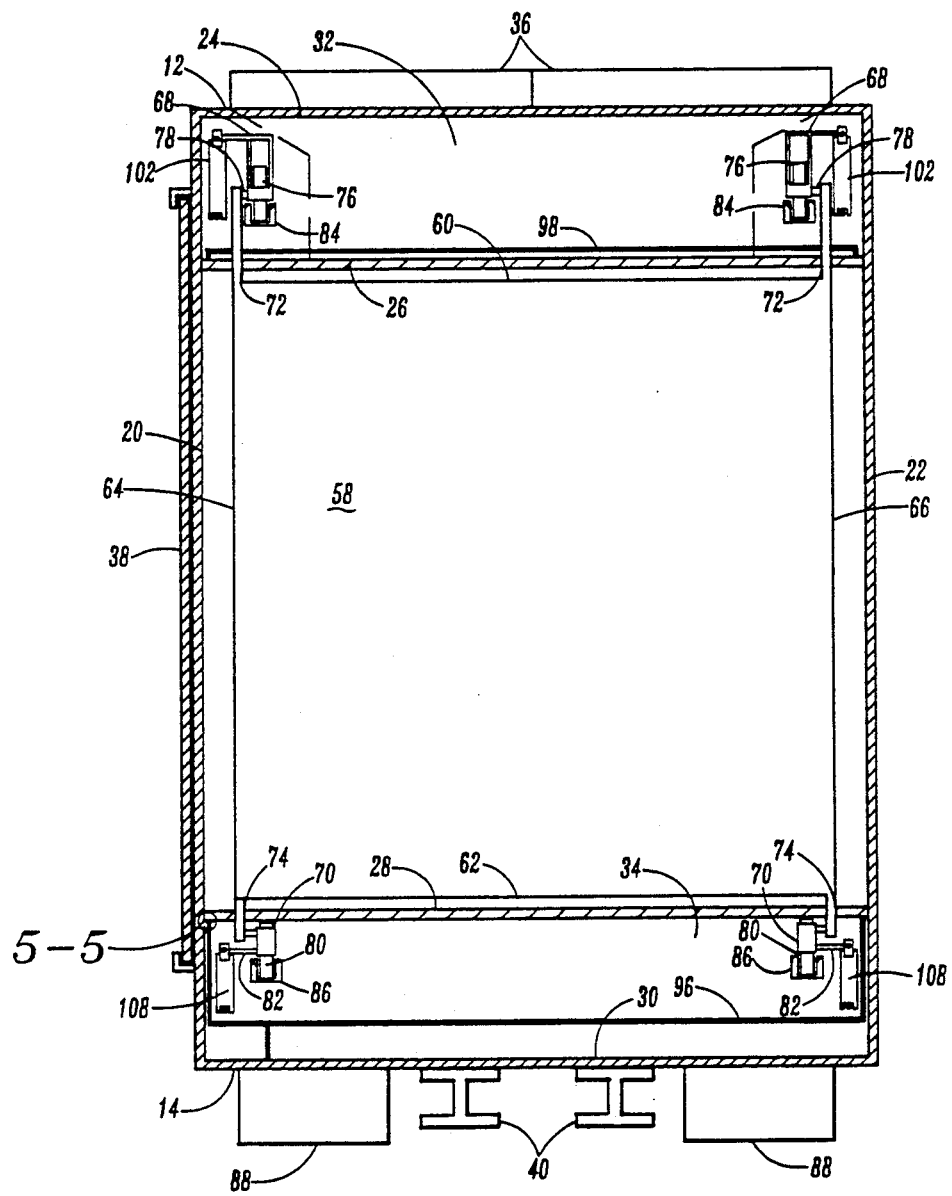
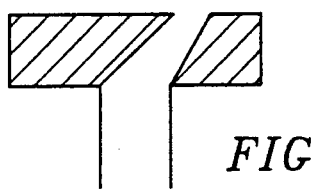
FIG 4
FIG 5

RAILROAD CAR TRASH COMPACTOR

BACKGROUND OF THE INVENTION

This invention relates to a railroad car trash compactor and method for using same.

The handling and transporting of waste materials has involved in some situations the use of rail transport. It is therefore desirable to have a convenient railroad car which is capable of carrying waste materials and which is capable of facilitating the ease of handling of those waste materials both before and after transporting.

Therefore, a primary object of the present invention is the provision of an improved railroad car trash compactor and method for using same.

A further object of the present invention is the provision of a trash compactor which includes a blade therein which is movable from one end of the car to the other to compress the trash material and ultimately to expel the trash material from the car.

A further object of the present invention is the provision of a railroad car trash compactor and method for using same which provides a simple and easy manner in which to clean the car after it has been used.

A further object of the present invention is the provision of an improved rail car trash compactor which includes drain means for draining waste water from the car both during and after use.

A further object of the present invention is the provision of a railroad car trash compactor and method for using same which provides means for easily loading the car with waste materials.

A further object of the present invention is the provision of an improved railroad car trash compactor which is economical to use, efficient in operation, and durable throughout extended use.

SUMMARY OF THE INVENTION

The present invention utilizes an elongated railway car having a box forming a container therein. Within the container is a compaction blade which is mounted for longitudinal movement from the forward end of the container to the rear. The compactor blade includes upper rollers and lower rollers which are guided within tracks to facilitate movement of the blade from the forward end of the container to the rear. Chain drives are mounted both above and below the comparator blade and are attached to the compactor blade for causing the blade to move from its forward to its rear positions.

The rear end of the car includes openable doors so that the compactor blade can force the trash outwardly through the rear end of the car for emptying the car. Steam jets are provided along the length of the interior of the car, and are connected to a source of pressurized steam. The steam jets can be used to clean the interior of the car after the trash has been expelled from the car.

A drain is provided in the floor of the car for draining away the condensed steam and also for draining away any waste water which is within the trash. The drain is connected to a waste water storage tank mounted on the underside of the railway car.

A plurality of doors are provided in the upper wall of the railway car and can be opened to permit the depositing of trash into the car at various points along the length of the car.

In operation, the compactor blade is moved to the forward end of the car. The trash is deposited in the car through the openings in the upper wall thereof. The compactor blade is then used to move against the trash and compress the trash between the compactor blade and the rear wall of the car. The compactor blade is capable of providing pressures of approximately 800 pounds per square inch.

When the car is full, it is used to transport the trash to the desired location. At the deposit site, the rear doors of the railway car are opened, and the compactor blade is moved to the rear end of the car so as to force the trash outwardly through the rear opening.

DESCRIPTION OF THE FIGURES OF THE DRAWINGS

FIG. 4 is a sectional view taken along line 4—4 of FIG. 3.

FIG. 5 is an enlarged detailed view taken along line 5—5 of FIG. 4.

DESCRIPTION OF THE PREFERRED EMBODIMENT

Figure 1:
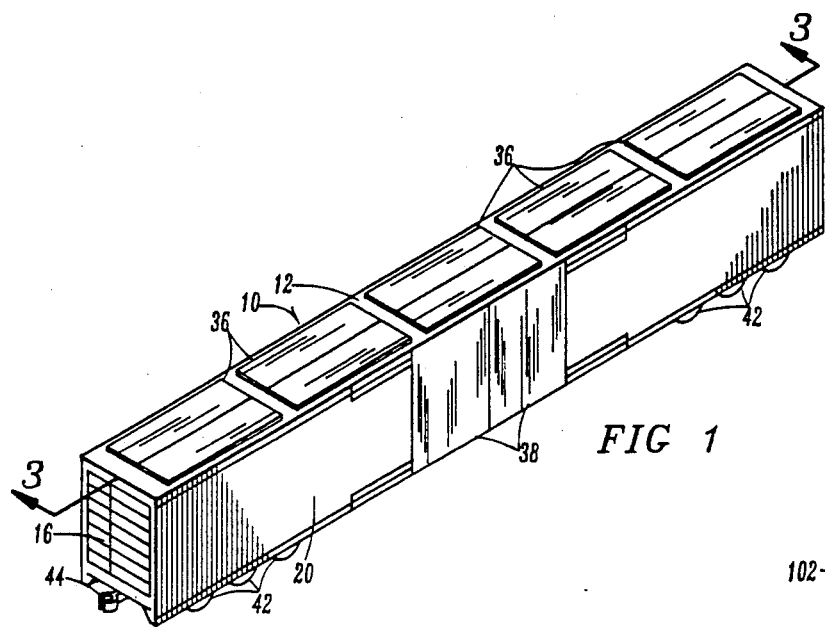
FIG. 1 is a perspective view of the railway car trash compactor of the present invention.

Referring to the drawings, the numeral 10 generally designates a railroad car trash compactor of the present invention.

Car 10 includes a top wall 12, a bottom wall 14, end walls 16, 18, and sidewalls 20, 22. The top wall 12 is comprised of an upper panel 24 and a lower panel 26, and the bottom wall 14 is comprised of an upper panel 28 and a lower panel 30. Between upper panels 24, 26 is an upper space 32, and between lower panels 28, 30 is a lower space 34.

Top wall 12 is provided with a plurality of inlet doors 36 along its length which can be opened to provide access to the interior of the car. Sidewall 18 includes a pair of side doors 38. The railway car 10 includes a support frame 40 under which are mounted conventional railway wheel assemblies 42, each having a coupler 44 connected thereto.

Figure 6:
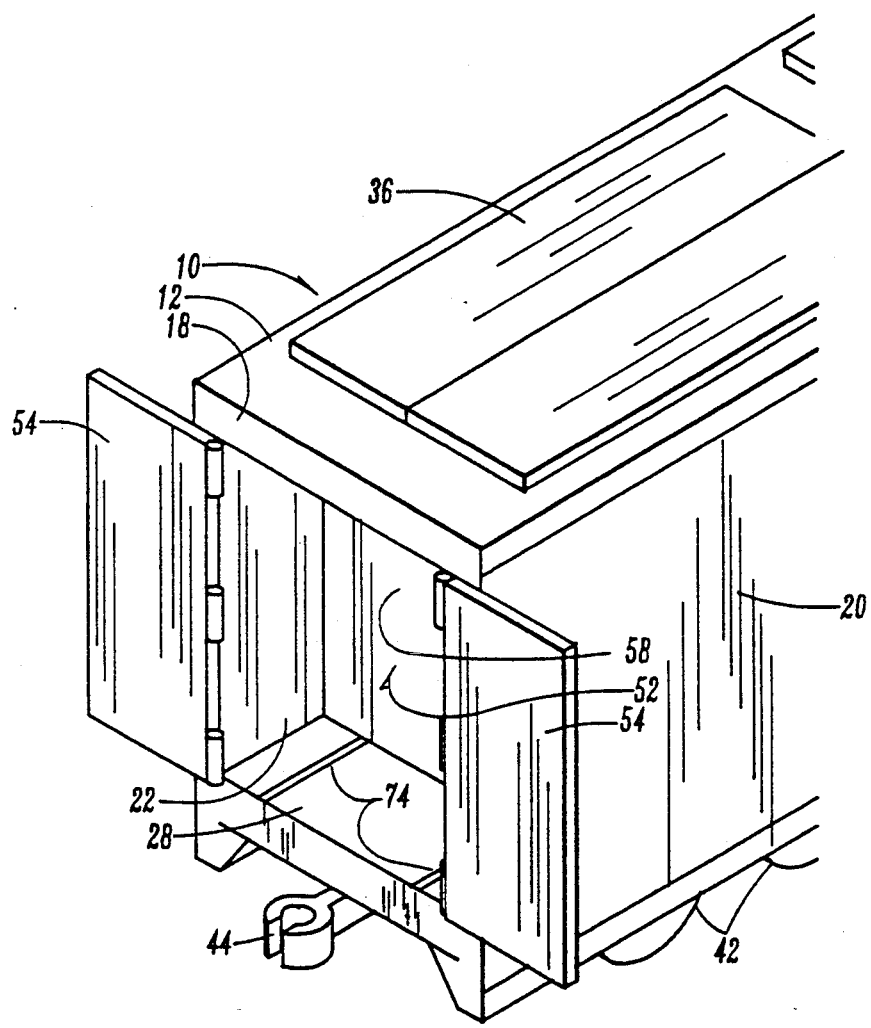
FIG. 6 is a partial perspective view of the rear end of the railway car.

The front end wall 16 includes a front outer panel 46 and an inner panel 48 which define a front space 50 therebetween. The rear wall 18 includes a discharge opening 52 therein over which are provided a pair of discharge doors 54 which are moveable from a closed position closing off the discharge opening 52 to an open position such as shown in FIG. 6 exposing the discharge opening and permitting the contents of the trash compartment 56 to be emptied.

Within trash compartment 56 is a compactor blade 58 having a top edge 60, a bottom edge 62, and a pair of opposite side edges 64, 66. Extending upwardly from the top edge 60 are a pair of upper roller brackets 68, and extending downwardly from the bottom edge 62 are a pair of lower roller brackets 70. Brackets 68 extend through a pair of upper slots 72 in the lower panel 26 of top wall 12. The lower roller brackets 70 extend through a spaced apart pair of lower slots 74 in the upper panel 28 of bottom wall 14. Mounted on the upper ends of upper roller bracket 68 are a pair of upper rollers 76 which are rotatable about axles 78. Mounted within the lower space 46 between upper and lower panels 28, 30 of bottom wall 14 are a pair of lower rollers 80 which are rotatable about axles 82. Upper rollers 76 roll within upper tracks 84, and lower rollers 80 roll within lower tracks 86 so as to permit the compactor blade 58 to be moved from its fill position which is at the extreme left end of the car as viewed in FIG. 3 to its discharge position which is located at the extreme right end of the car shown in FIG. 3.

A drive system is provided for moving the compactor blade 58 from its fill position to its discharge position. The drive system comprises a pair of upper front sprockets 102 which are connected by an axle 103 and a pair of upper rear sprockets 104. Trained around the sprockets 102, 104 are a pair of chains 106 Sprockets 102, 104 and chain 106 are all located within the upper space 32 between upper and lower panels 24, 26 of top wall 12.

Located within the lower space 34 between upper and lower panels 28, 30 of bottom wall 14 are a pair of lower front sprockets 108 interconnected by an axle 107 and a pair of lower rear sprockets 110. Trained around sprockets 108, 110 are a pair of chains 112.

Located within front space 50 is a drive axle 114 which includes at one end an upper drive sprocket 116 having an upper drive chain 118 trained therearound and also trained around upper sprocket 102. Upper sprocket 102 is preferably a dual sprocket capable of accommodating the upper drive chain 118 and the chain 106.

Connected to the other end of drive axle 114 is a lower drive sprocket 120 having a lower drive chain 122 connected thereto and trained around lower sprocket 108 which is a dual sprocket similar to upper sprocket 102. Interposed in the middle of drive axle 114 is a hydraulic drive motor 124 having dual output shafts 126, 128 which are connected to axle 114 by couplings 130. Actuation of the hydraulic cylinder 124 causes rotation of the drive axle 114 in the direction shown by the arrows, thereby causing similar rotation of the upper axle 103 and the lower axle 107.

Figure 2:
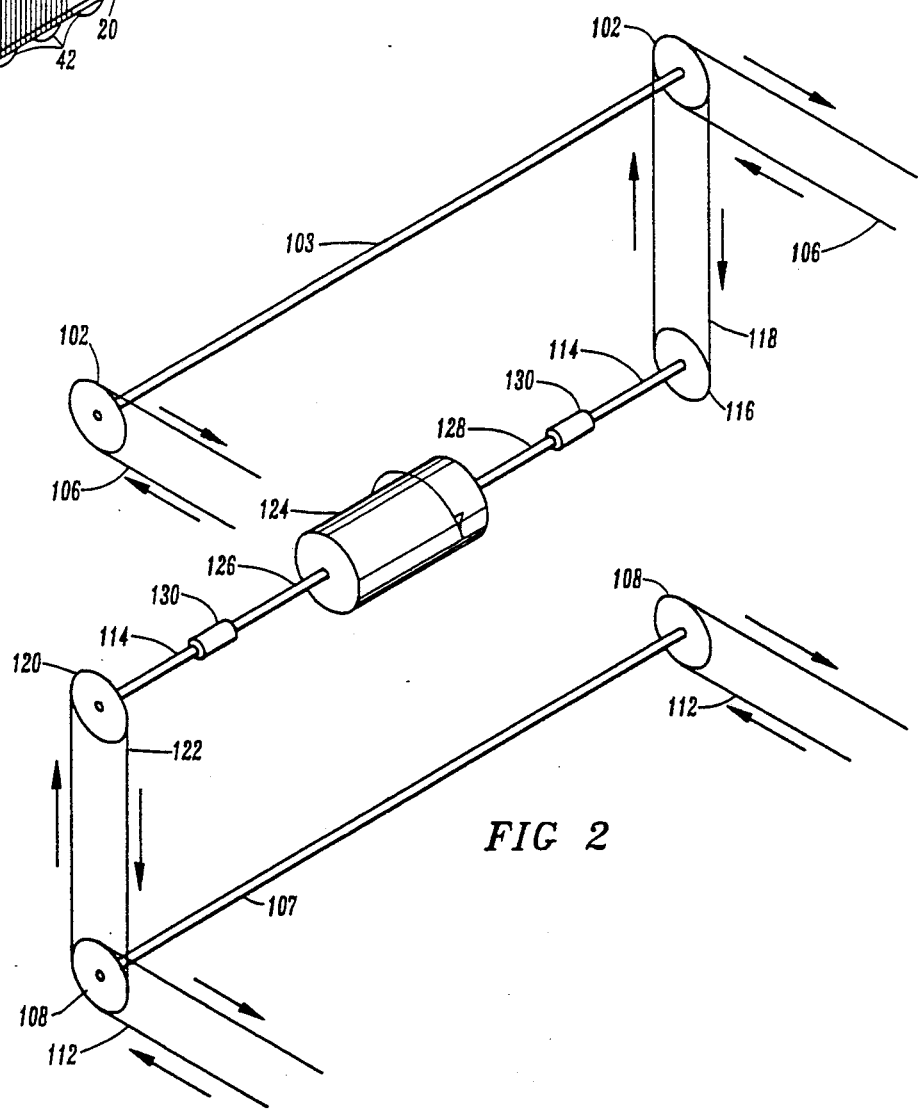
FIG. 2 is a schematic view showing the drive train for operating the chains to move the compactor blade.

The upper roller brackets 68 and the lower roller brackets 70 are attached to the upper runs of chains 106, 112 and, therefore, actuation of the hydraulic motor 124 causes the chains to move and causes corresponding movement of compactor blade 58 between its fill position and its discharge position. The motor 124 is reversible so as to be capable of reversing the rotational direction of drive axle 114 in a direction opposite from the arrows shown in FIG. 2.

Figure 3:
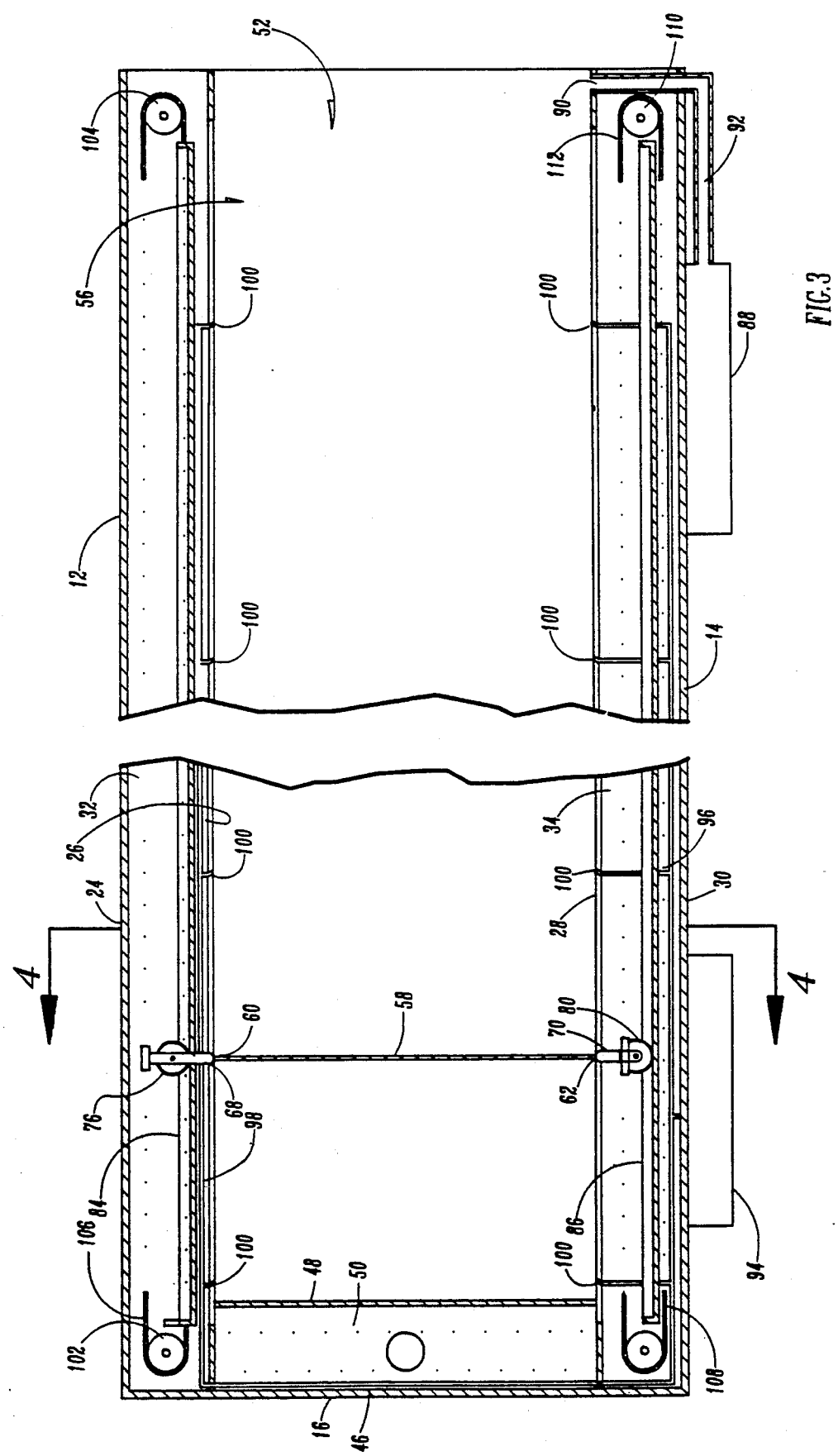
FIG. 3 is a longitudinal sectional view taken along line 3—3 of FIG. 1.

In operation, the compactor blade is first moved to its fill position at the extreme left end of the car as shown in FIG. 3. The inlet doors 36 in the top wall 12 of rail car 10 are opened. These doors may be hinged, or they may be slidable in a horizontal direction without detracting from the invention. They are opened, and the trash to be disposed of is placed into the car through these openings. The trash is positioned between the compactor blade 58 and the closed discharge doors 54.

Periodically, during the time the material is being placed in the car, the compactor blade 58 can be moved towards its discharge position, thereby causing compaction of the trash materials within the container. The blade is then moved back to its fill position and further trash is added. When the car is full, the inlet doors 36 are closed, and the material is transported to its desired location.

At the desired location, the discharge doors 54 are opened as shown in FIG. 6, and the compactor blade 58 is moved to its discharge position. This causes the trash to be expelled from the discharge opening 52 of the car.

A steam system is provided for cleaning the interior of the trash compartment 56. The steam system includes one or more steam tanks 94 mounted on the undercarriage of the car. Lower steam lines 96 and upper steam lines 98 are connected to the steam tank, and also connected to a plurality of spray nozzles 100 which are located at the four corners of the trash compartment 56, and which are also located at spaced apart intervals along the length of trash compartment 56. Periodically, valves (not shown) may be opened to introduce steam to these spray openings 100 thereby causing the steam to be sprayed into the interior of the compartment for cleaning of the compartment. The bottom wall 14 of the compartment includes a drain 90 which is connected to a waste water tank 88 by means of a drain line 92. This permits the draining away of the waste water within the container 56 as well as the condensed water resulting from the spraying of steam nozzles 100.

Thus, after the car has been emptied, the compactor blade 58 can be returned to its fill position, the spray nozzles 100 can be opened so as to spray the interior of the tank and cause it to be cleaned. The drain 90 permits the draining away of the condensed water resulting from the steam.

Thus, it can be seen that the device accomplishes at least all of its stated objectives.

I claim:

1. A railroad car trash compactor comprising:
a railroad car having a support frame, wheel assembly means mounted on said support frame and adapted to engage and roll upon a railroad track, and an elongated box mounted upon said support frame;
said elongated box having a substantially flat top wall, a floor, opposite first and second end walls, and opposite substantially straight first and second sidewalls defining an elongated trash compartment;
said first end wall being provided with door means movable from a closed position forming a closure for said end wall to an open position forming a discharge opening in said box for permitting the removal of trash within said trash compartment;
said top wall having at least one inlet opening therein for permitting the insertion of trash into said trash compartment and having a pair of elongated slots therein;
a compactor blade within said trash compartment having a top edge, a bottom edge, and first and second side edges positioned closely adjacent said top wall, said floor, and said first and second sidewalls respectively of said box;
said floor being substantially flat and free of protruding obstructions interfering with the movement of said trash and compactor blade;
a pair of elongated slots in said floor;
blade mounting means connected to said compactor blade and movably mounting said compactor blade within said trash compartment for movement along the length of said trash compartment from a fill position adjacent said second end wall of said box to a discharge position adjacent said first end of said box, said blade mounting means extending from within said trash compartment through said slots in said top wall to a position above said top wall, said blade mounting means also extending from within said compartment through said slots in said floor to a position below said floor; and blade power means above said top wall and below said bottom wall connected to said blade mounting means for moving said compactor blade from said fill position to said discharge position.

2. A trash compactor according to claim 1 wherein said compartment has a rectangular cross sectional configuration including four rectangular corners and a plurality of steam jets are positioned at spaced intervals along the length of said trash compartment, said steam jets being connected to a source of pressurized steam and being positioned in at least some of said compartment corners to spray said steam into said compartment for cleaning said compartment.

3. A trash compactor according to claim 2 wherein drain means are provided in said floor of said box for draining away water within said trash compartment, a waste water tank being mounted to said support frame below said floor and being fluidly connected to said drain for receiving waste water therefrom.

4. A trash compactor according to claim 1 wherein said blade power means comprises first and second sprocket means rotatably mounted adjacent said first and second end walls respectively of said box, chain means trained around said first and second sprocket means, said blade mounting means extending through said slots and connecting said compactor blade to said chain means for movement in unison therewith during movement of said chain means around said first and second sprocket means such that said chain and sprockets are wholly outside said trash compartment.

5. A trash compactor according to claim 4 wherein said top wall and said floor are of double panel construction and each comprise an upper panel and a lower panel spaced apart from one another to form an upper space between said upper and lower panels of said top wall and a lower space between said upper and lower panels of said floor, said first and second sprocket means comprising at least one pair of upper sprockets in said upper space and at least one pair of lower sprockets in said lower space, said chain means comprising at least one upper chain within said upper space trained around said pair of upper sprockets and at least one lower chain within said lower space trained around said lower sprockets.

6. A trash compactor according to claim 5 wherein said blade mounting means comprise upper and lower track means positioned within said upper and lower spaces respectively and upper and lower wheel means rotatably mounted to said compactor blade, said upper and lower wheel means engaging and rolling within said upper and lower track means respectively.

7. A trash compactor according to claim 1 wherein said blade power means comprises a hydraulic motor such that said blade power means is free of gear reducers.

* * * * *